UNITED STATES PATENT OFFICE.

FRIEDRICH SCHMIDT, OF HÖCHST-ON-THE-MAIN, GERMANY, ASSIGNOR TO THE FARBWERKE, VORMALS MEISTER, LUCIUS & BRÜNING, OF SAME PLACE.

DIAMIDODIPHENYLAMIN SULFONIC ACID AND PROCESS OF MAKING SAME.

SPECIFICATION forming part of Letters Patent No. 647,237, dated April 10, 1900.

Application filed March 15, 1899. Serial No. 709,189. (Specimens.)

*To all whom it may concern:*

Be it known that I, FRIEDRICH SCHMIDT, Ph. D., a citizen of the Empire of Germany, residing at Höchst-on-the-Main, Germany, have invented certain new and useful Improvements in the Manufacture of Diamidodiphenylamin Disulfonic Acid and Azo Dyestuffs Therefrom, of which the following is a specification.

I have found that nitrochlorbenzene sulfonic acid of the constitution

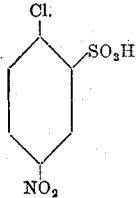

reacts under appropriate conditions with diamin sulfonic acid, while splitting off hydrochloric acid, and that in this way new diphenylamin derivatives may be obtained, which are of great importance to industry. If the said acid be allowed to act, for instance, upon para-phenylenediamin sulfonic acid, amidonitrophenylamin disulfonic acid is first obtained and from this the diamidodiphenylamin disulfonic acid.

The constitution of the new acid is:

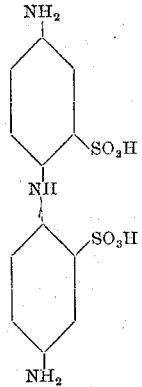 *or* 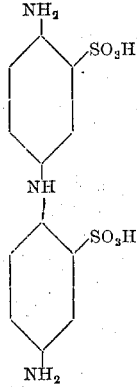

*Example I.*—One hundred and fifty kilos of para-phenylenediamin sulfonic acid, two hundred kilos of para-nitrochlorbenzene sulfonic acid, one hundred kilos of soda, and one thousand kilos of water are boiled for six hours in a vessel provided with an inverted condenser. The brown-yellow solution thus obtained is acidified with hydrochloric acid, whereupon amidonitrodiphenylamin disulfonic acid, at first formed, separates as a thick greyish-yellow precipitate. It is filtered, pressed, and reduced in the usual manner with iron and acetic acid. The liquid of reduction, made alkaline with soda, having been filtered from the iron, diamidodiphenylamin disulfonic acid is precipitated by an addition of mineral acid. It separates as a greyish-white crystalline precipitate which is insoluble in an excess of hydrochloric acid. The acid is soluble with difficulty in water. It is easily diazotized and forms a yellow tetrazo compound, soluble with difficulty, which combines with the usual components to form valuable azo dyestuffs characterized by their solubility and the fastness of their tints.

*Example II—Manufacture of a black direct dyeing cotton dyestuff of the constitution:*

$$\text{Diamidodiphenylamin disulfonic acid} \begin{cases} \text{Amidonaphtholsulfonic acid G-meta-phenylenediamin} \\ \text{Amidonaphtholsulfonic acid G-meta-phenylenediamin.} \end{cases}$$

35.9 kilos of diamidodiphenylamin disulfonic acid are dissolved in 24.0 kilos of caustic-soda lye of 40° Baumé and one thousand liters of water, to which are added 13.8 kilos of nitrite. The whole is run, while stirring, into 60.0 kilos of hydrochloric acid, 22° Baumé, diluted with two hundred liters of water. The yellow-colored tetrazo compound, soluble with difficulty, which is at once formed, is run into a solution of forty-eight kilos of amidonaphtholsulfonic acid G in forty kilos of soda and one thousand liters of water, when a violet dyestuff (diamidodiphenylamin disulfonic acid + 2 amidonaphtholsulfonic acid G) is obtained, which remains dissolved in the liquid. This dyestuff is again diazotized by first adding seventy kilos of hydrochloric acid to the violet solution, whereupon the color becomes a pure blue, and then 13.8 kilos of nitrite are added. Finally, twenty-two kilos of meta-phenylenediamin, dissolved in five hundred liters of water, are added, so as to form the black dyestuff. The dyestuff separates as a black precipitate. It is neutralized with soda and heated, whereupon the dyestuff dissolves. It is salted out, filtered, pressed, and dried. The dyestuff is a powder of bronze luster, soluble in boiling water, with a black-violet color, dyeing unmordanted cotton deep black in an alkaline bath.

*Example III—Manufacture of a violet cotton dyestuff which turns brown by developing on the fiber and has the following constitution:*

$$\text{Diamidodiphenylamin disulfonic acid} \begin{cases} \text{Meta-phenylenediamin} \\ \text{Meta-phenylenediamin.} \end{cases}$$

The tetrazo compound obtained from 35.9 kilos of diamidodiphenylamin disulfonic acid is poured, while stirring, into a solution of twenty-two kilos of meta-phenylenediamin at 40° centigrade in five hundred liters of water. A brown precipitate is formed at once, consisting of the free dyestuff acid. When heated with twenty kilos of soda or twenty-four kilos of caustic-soda lye, 40° Baumé, it dissolves with a red-brown color, and on addition of salt is again precipitated as sodium salt, easily soluble. The dyestuff yields on unmordanted cotton in a weak alkaline bath red tints, which when treated with acids become violet and with diazonitrobenzene a very fast deep brown.

By employing meta-toluylenediamin instead of meta-phenylenediamin similar dyestuffs may be obtained.

Having now described my invention, what I claim is—

1. A process for the manufacture of diamidodiphenylamin disulfonic acid, which consists in condensing molecular quantities of para-chlornitrobenzenesulfonic acid or its salts with para-phenylenediaminsulfonic acid or its salts and subsequent reduction, substantially as described.

2. As new product the diamidodiphenylamin disulfonic acid, being a greyish-white powder, in form of its free acid soluble with difficulty or insoluble in water, alcohol, &c., forming in water with alkali carbonate or alkali lye easily soluble alkali salts from the aqueous solutions of which on addition of mineral acid the free diamidodiphenylamin disulfonic acid is again precipitated, forming with nitrous acid a yellow-colored tetrazo compound soluble with difficulty, yielding with the usual components valuable dyestuffs.

In testimony that I claim the foregoing as my invention I have signed my name in presence of two subscribing witnesses.

FRIEDRICH SCHMIDT.

Witnesses:
HEINRICH HAHN,
BERNHARD LEYDECKER.